United States Patent
Omori et al.

(10) Patent No.: US 10,659,106 B2
(45) Date of Patent: May 19, 2020

(54) RFID TAG

(71) Applicant: Murata Manufacturing Co., Ltd., Nagaokakyo-shi, Kyoto-fu (JP)

(72) Inventors: Ryohei Omori, Nagaokakyo (JP); Noboru Kato, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 16/209,162

(22) Filed: Dec. 4, 2018

(65) Prior Publication Data

US 2019/0109617 A1 Apr. 11, 2019

Related U.S. Application Data

(63) Continuation of application No. PCT/JP2018/016417, filed on Apr. 23, 2018.

(30) Foreign Application Priority Data

Apr. 28, 2017 (JP) .................. 2017-090310

(51) Int. Cl.
*G06K 19/077* (2006.01)
*H04B 5/00* (2006.01)
(Continued)

(52) U.S. Cl.
CPC ......... *H04B 5/0031* (2013.01); *G06K 19/077* (2013.01); *G06K 19/07775* (2013.01);
(Continued)

(58) Field of Classification Search
CPC .. H04B 5/0031; H04B 5/0062; H04B 5/0081; G06K 19/07775; G06K 19/07794;
(Continued)

(56) References Cited

U.S. PATENT DOCUMENTS 8,602,310 B2  12/2013  Kato et al.
9,129,203 B2  11/2015  Perthou
(Continued)

FOREIGN PATENT DOCUMENTS

JP  2008310453 A  12/2008
JP  2013089022 A  5/2013
(Continued)

OTHER PUBLICATIONS

International Searching Report issued for PCT/JP2018/016417, dated Jun. 26, 2018.
(Continued)

*Primary Examiner* — Seung H Lee
(74) *Attorney, Agent, or Firm* — Arent Fox LLP

(57) ABSTRACT

An RFID tag with an RFIC module including a substrate, an RFIC chip disposed on the substrate, and a loop conductor disposed on the substrate and connected to the RFIC chip; and an antenna base material mounted with the RFIC module and including an antenna conductor with a radiating portion radiating radio waves and a coupling portion connected to the radiating portion, for electromagnetic field coupling with the loop conductor. Moreover, the loop conductor includes a first loop pattern formed on a first main surface of the substrate, a second loop pattern formed on a second main surface confronting the first main surface, and an interlayer connection conductor extending through the substrate, for connecting the first and the second loop patterns in series.

20 Claims, 13 Drawing Sheets

(51) Int. Cl.
*H01Q 1/22* (2006.01)
*H01Q 9/26* (2006.01)

(52) U.S. Cl.
CPC . *G06K 19/07786* (2013.01); *G06K 19/07794* (2013.01); *H01Q 1/2225* (2013.01); *H01Q 9/26* (2013.01); *H04B 5/0062* (2013.01); *H04B 5/0081* (2013.01)

(58) Field of Classification Search
CPC .. G06K 19/07786; G06K 19/077; H01Q 9/26; H01Q 1/2225
See application file for complete search history.

(56) References Cited

U.S. PATENT DOCUMENTS

| | | | |
|---|---|---|---|
| 2011/0049249 A1* | 3/2011 | Kato | G06K 19/07749 235/492 |
| 2012/0325915 A1 | 12/2012 | Kato et al. | |
| 2014/0326791 A1 | 11/2014 | Ishida et al. | |

FOREIGN PATENT DOCUMENTS

| | | | |
|---|---|---|---|
| JP | 2014232904 A | 12/2014 | |
| WO | WO 2011108341 A1 | 9/2011 | |
| WO | WO 2017135331 A1 | 8/2017 | |

OTHER PUBLICATIONS

Written Opinion of the International Searching Authority issued for PCT/JP2018/016417, dated Jun. 26, 2018.

\* cited by examiner

Fig.3
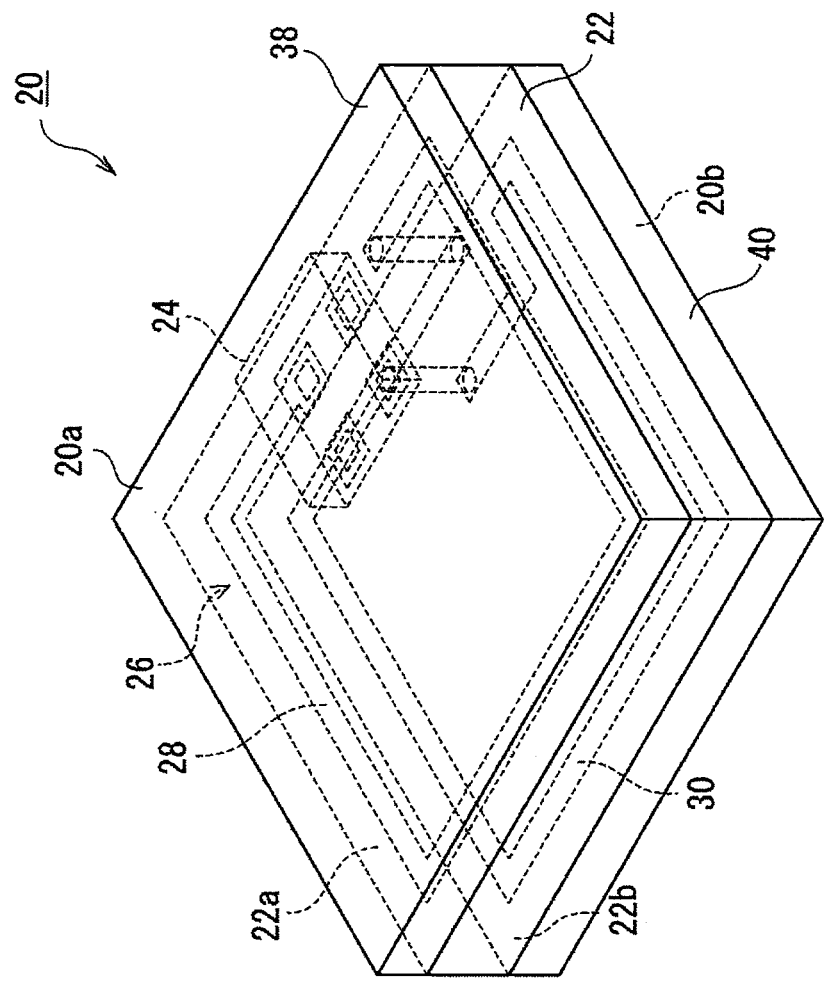
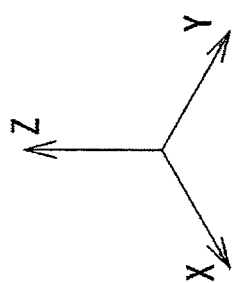

*Fig.4*
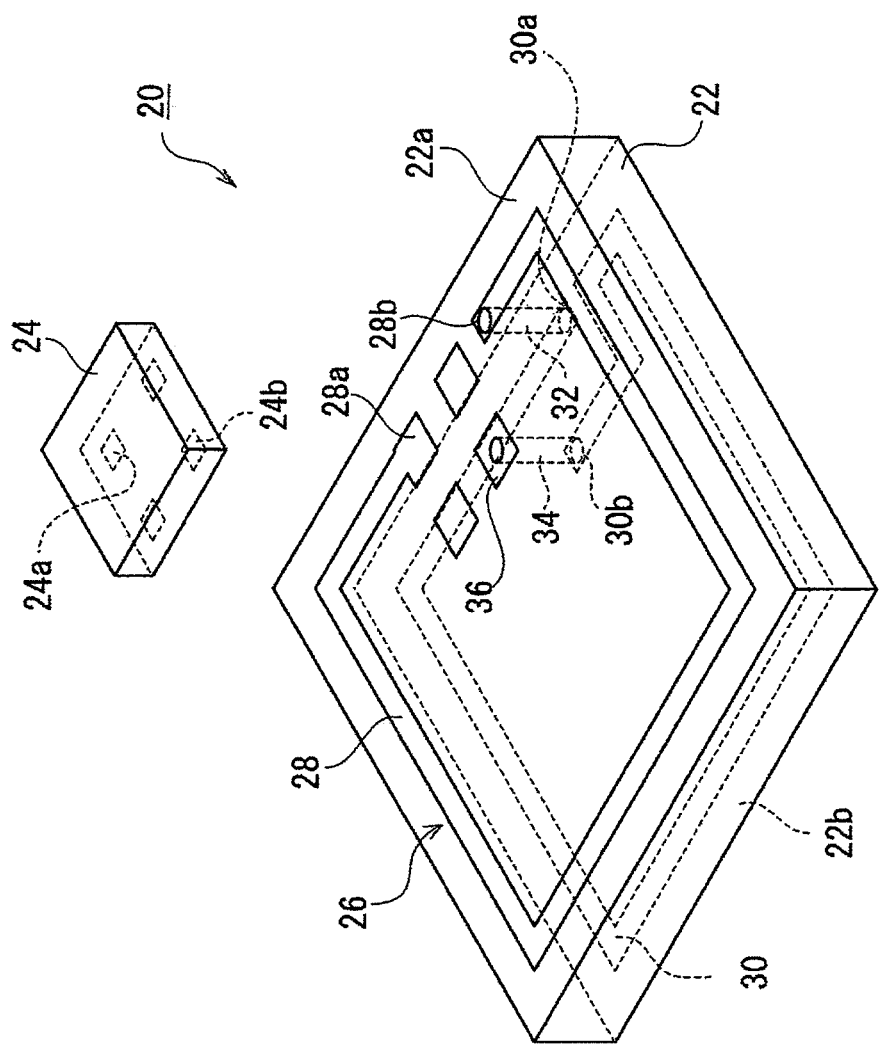
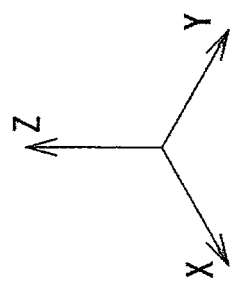

RFID TAG

CROSS REFERENCE TO RELATED APPLICATIONS

The present application is a continuation of PCT/JP2018/016417 filed Apr. 23, 2018, which claims priority to Japanese Patent Application No. 2017-090310, filed Apr. 28, 2017, the entire contents of each of which are incorporated herein by reference.

TECHNICAL FIELD

The present disclosure relates to an RFID tag.

BACKGROUND

For example, Patent Document 1 (identified below) discloses an RFID (Radio-Frequency IDentification) tag that includes an RFIC (Radio-Frequency Integrated Circuit) module having a spiral coil formed on a silicon substrate; and a sheet-shaped antenna base material mounted with the RFIC module and having an antenna. The coil of the RFIC module and the antenna of the antenna base material are connected to each other via electromagnetic field coupling, and hence there is no need for DC connection using soldering, etc. For that reason, even though the RFID tag is used under sever conditions causing repetitive deformations, for example, even if it is attached to linen subjected to repetitive washing, connection between the RFIC module and the antenna can be maintained.

Patent Document 1: JP2008-310453A.

With regard to the RFID tag described in Patent Document 1, the coil of the RFIC module and the antenna are electromagnetic field coupled together. Therefore, in order to obtain desired communication characteristics of the RFID tag without variations, the RFIC module needs to be mounted on the antenna base material without variations at a certain position and posture. Particularly, in the case of the RFID tag described in Patent Document 1, since the spiral coil is formed in one surface of the silicon substrate, if the RFIC module is mounted upside down on the antenna base material, the communication characteristics, i.e. the degree of coupling between the coil and the antenna varies to a great extent.

SUMMARY OF THE INVENTION

It is therefore an object of the present disclosure to provide the RFIC module and the antenna in the RFID tag to be electromagnetic field coupled together, while suppressing the variations in the degree of coupling therebetween.

In order to achieve the above object, according to an aspect, an RFID tag is provided that includes an RFIC module including a substrate, an RFIC chip disposed on the substrate, and a loop conductor disposed on the substrate and connected to the RFIC chip; and an antenna base material mounted with the RFIC module and comprising an antenna conductor including a radiating portion radiating radio waves and a coupling portion connected to the radiating portion, for electromagnetic field coupling with the loop conductor. Moreover, the loop conductor includes a first loop pattern formed on a first main surface of the substrate, a second loop pattern formed on a second main surface confronting the first main surface, and an interlayer connection conductor extending through the substrate, for connecting the first and the second loop patterns in series.

According to the invention, the RFIC module and the antenna in the RFID tag can be electromagnetic field coupled together while suppressing the variations in the degree of coupling therebetween.

BRIEF DESCRIPTION OF DRAWINGS

FIG. 3 is a perspective view of an RFIC module.

FIG. 4 is an exploded perspective view of the RFIC module.

DETAILED DESCRIPTION

Figure 1:
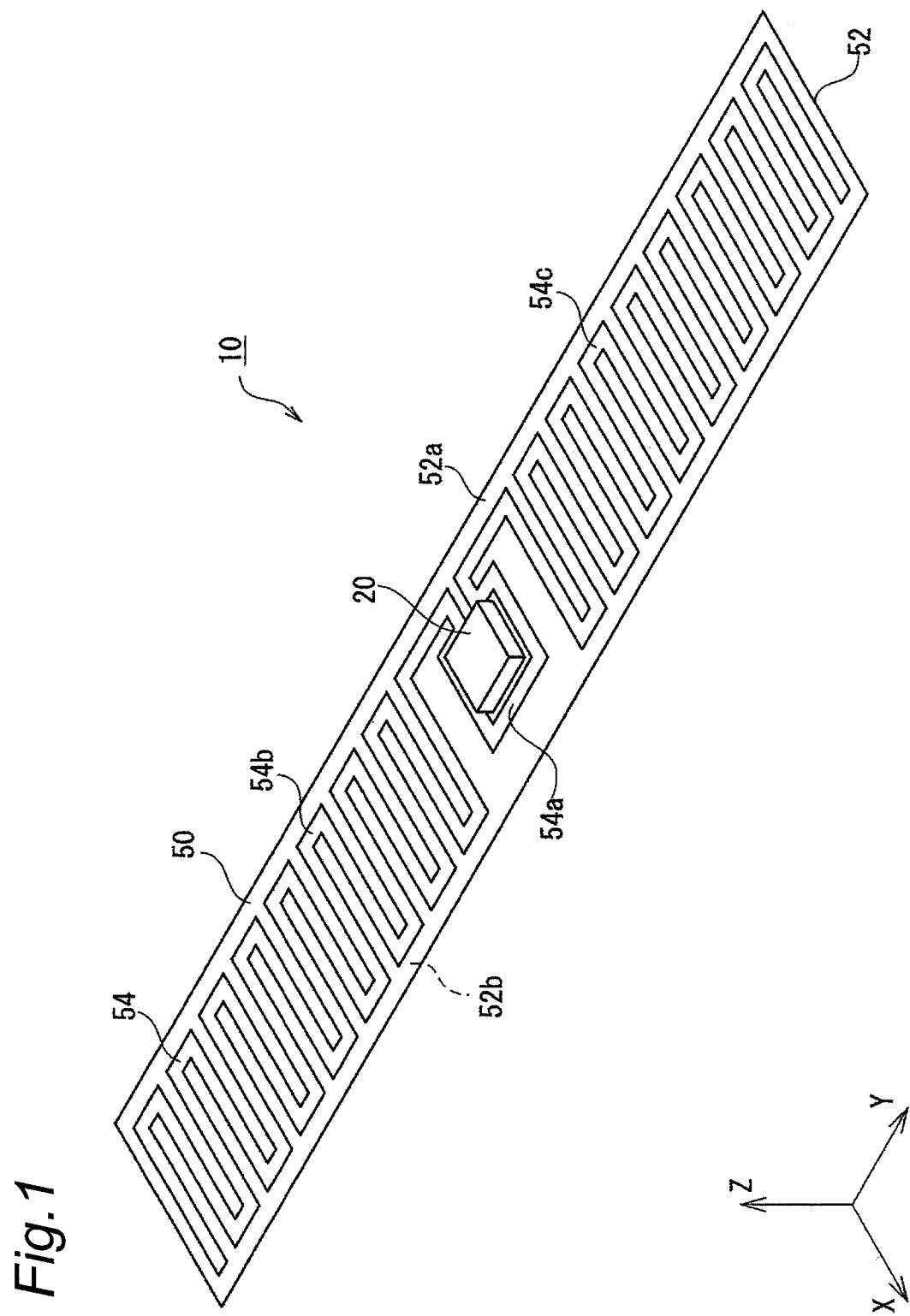
FIG. 1 is a perspective view of an RFID tag according to a first exemplary embodiment.

An RFID tag according to an exemplary aspect includes an RFIC module including a substrate, an RFIC chip disposed on the substrate, and a loop conductor disposed on the substrate and connected to the RFIC chip; and an antenna base material mounted with the RFIC module and comprising an antenna conductor including a radiating portion radiating radio waves and a coupling portion connected to the radiating portion, for electromagnetic field coupling with the loop conductor. Moreover, the loop conductor includes a first loop pattern formed on a first main surface of the substrate, a second loop pattern formed on a second main surface confronting the first main surface, and an interlayer connection conductor extending through the substrate, for connecting the first and the second loop patterns in series.

According to the aspect, the RFIC module and the antenna in the RFID tag can be electromagnetic field coupled together while suppressing the variations in the degree of coupling therebetween.

The coupling portion of the antenna conductor may be a looped coupling portion, and the RFIC module may be disposed inside the looped coupling portion when viewed from a direction in which the RFIC module is mounted on the antenna base material.

The coupling portion of the antenna conductor may be a looped coupling portion, and the RFIC module may be mounted on the antenna base material so as to overlap with the looped coupling portion when viewed from a direction in which the RFIC module is mounted on the antenna base material. This allows the RFIC module to protect the looped coupling portion of the antenna conductor.

The looped coupling portion may be of a loop shape of one turn or more including a three-dimensional intersection, and the RFIC module may be mounted on the antenna base material so as to at least partially overlap with the three-dimensional intersection. This allows the RFIC module to protect the three-dimensional intersection.

The looped coupling portion and the loop conductor of the RFIC module may overlap. This allows the looped coupling portion and the loop conductor to be electromagnetic field coupled with a higher degree of coupling.

The coupling portion of the antenna conductor may have a looped conductor of less than one turn disposed on a surface on one hand of the antenna base material, and a capacitance-forming conductor disposed on a surface on the other of the antenna base material, for capacitively coupling with one end and the other end of the looped conductor of less than one turn. This configures the looped coupling portion such that it is hard to disconnect in spite of great repetitive deformations in the antenna conductor. The resonant frequency of the antenna conductor can be substantially equal to the resonant frequency of the RFID tag, thereby enabling the coupling portion of the antenna conductor and the loop conductor of the RFID tag to be electromagnetic field coupled with a higher degree of coupling.

In an exemplary aspect, the antenna base material may have a flexibility. This enables an impact on the RFID tag to be warded off due to a free deformation of the antenna base material. As a result, coupling of the antenna base material with the RFIC module is more secured.

Embodiments of the present disclosure will now be described with reference to the drawings.

First Embodiment

Figure 2:
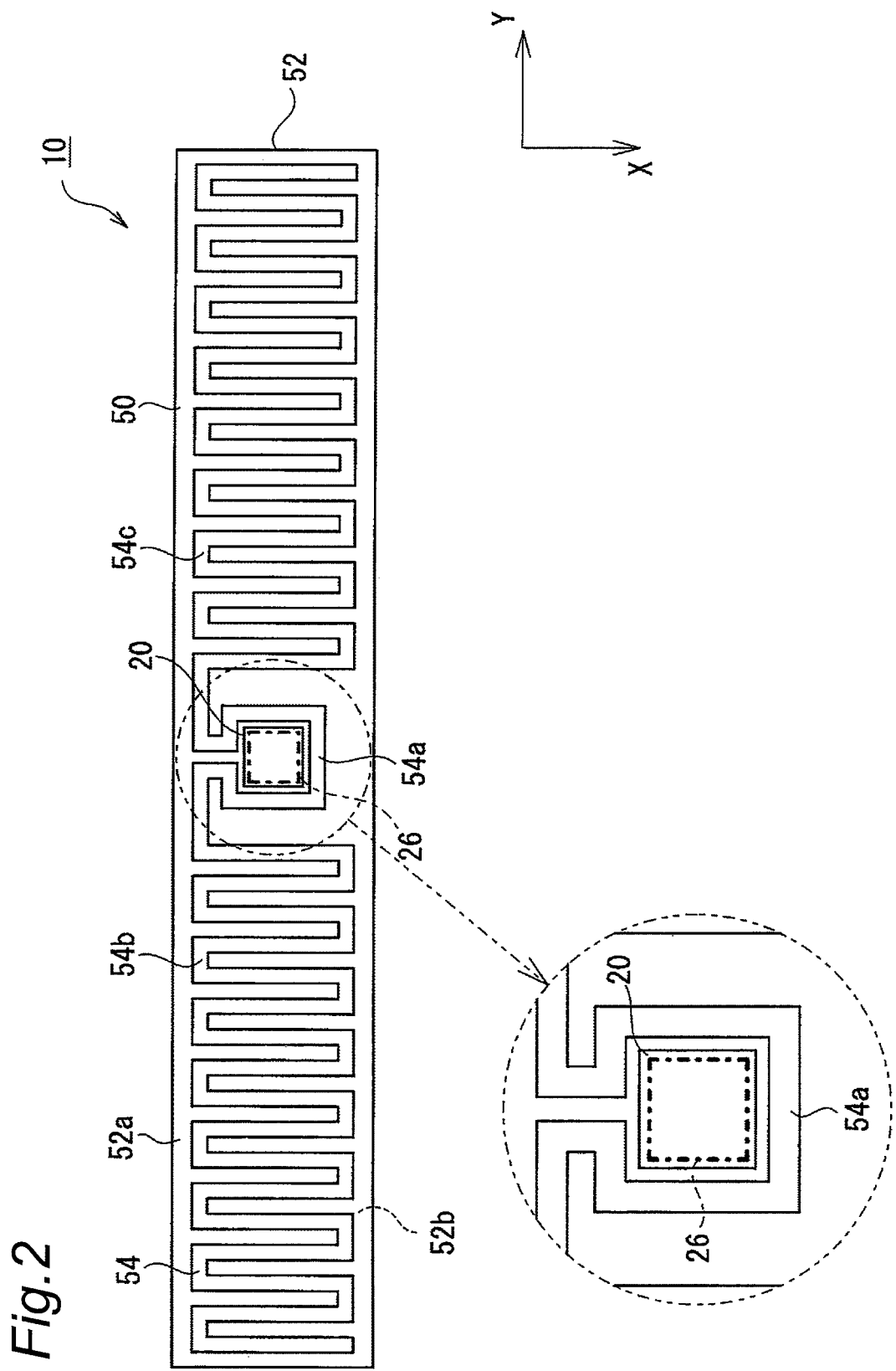
FIG. 2 is a top view of the RFID tag according to the first exemplary embodiment.

FIG. 1 is a perspective view showing a configuration of an RFID (Radio-Frequency Identification) tag according to a first exemplary embodiment, and FIG. 2 is a top view of the RFID tag. In the diagrams, an X-Y-Z coordinate system is provided for ease of understanding of the invention and is not intended to limit the invention. An X-axis direction indicates the width direction of the RFID tag, a Y-axis direction indicates the longitudinal direction, and a Z-direction indicates the thickness direction.

As shown in FIGS. 1 and 2, an RFID tag 10 comprises an RFIC (Radio-Frequency Integrated Circuit) module 20, and an antenna base material 50 mounted with the RFIC module 20.

FIG. 3 is a perspective view of the RFIC module 20 and FIG. 4 is an exploded perspective view.

As shown in FIG. 3, the RFIC module 20 is a rectangular parallelepiped block having sizes in the width direction (X-axis direction) and in the longitudinal direction (Y-axis direction) longer than a size in the thickness direction (Z-axis direction).

The RFIC module 20 comprises a substrate 22 such as a glass epoxy substrate used as a printed wiring board for example, and an RFIC chip 24 disposed on the substrate 22. In this RFIC module 20, a capacitance component held by the RFIC chip 24 itself and an inductance component of a loop conductor 26 make up a resonant circuit having a resonant frequency corresponding to a communication frequency (e.g. a frequency in the UHF zone).

As shown in FIGS. 3 and 4, the substrate 22 is in the shape of a rectangular parallelepiped that has a first main surface 22a and a second main surface 22b confronting (i.e., opposing) the first main surface 22a in the thickness direction (Z-axis direction) of the substrate 22. The first and the second main surfaces 22a and 22b have areas larger than those of remaining four end surfaces (surfaces at ends in the X-axis direction and surfaces at ends in the Y-axis direction). The RFIC chip 24 is mounted on the first main surface 22a.

The substrate 22 comprises the loop conductor 26 connected to the RFIC chip 24. Specifically, the loop conductor 26 includes a first loop pattern 28 formed on the main surface 22a of the substrate 22, a second loop pattern 30 formed on the second main surface 22b of the substrate 22, and an interlayer connection conductor 32 connected in series to the first and the second loop patterns 28 and 30.

The first and the second loop patterns 28 and 30 of the loop conductor 26 are configured from looped conductor patterns formed on the first and the second main surfaces 22a and 22b of the substrate 22. Specifically, the first and the second loop patterns 28 and 38 are of a semi-loop shape (C-shape) of less than one turn according to the exemplary aspect.

One end 28a (i.e., a first end) of the first loop pattern 28 formed on the first main surface 22a of the substrate 22 is connected to a first input/output terminal 24a of the RFIC chip 24. The other end 28b (i.e., a second end) of the first loop pattern 28 is connected to one end 30a of the second loop pattern 30 formed on the second main surface 22b. Specifically, the other end 28b of the first loop pattern 28 and the one end 30a of the second loop pattern 30 are connected via the interlayer connection conductor 32 such as a through-hole conductor extending through the substrate 22 in the thickness direction (Z-axis direction). The other end 30b of the second loop pattern 30 is connected via the interlayer connection conductor 34 to a land pattern 36 that is a land-shaped conductor pattern formed on the first main surface 22a. The land pattern 36 is connected to a second input/output terminal 24b of the RFIC chip 24.

According to the first exemplary embodiment, the first loop pattern 28 and the second loop pattern 30 preferably have the same width and generally confront each other in the thickness direction (Z-axis direction) of the substrate 22.

The RFIC chip 24 is configured for wireless communication at a predetermined communication frequency (e.g. a frequency in the UHF band). The RFIC chip 24 is mounted on the first main surface 22a of the substrate 22, with the first input/output terminal 24a being connected to the one end 28a of the first loop pattern 28 while the second input/output terminal 24b is connected to the land pattern 36.

According to the first exemplary embodiment, as shown in FIG. 3, a protective layer 38 such as a resin layer protecting the RFIC chip 24 and the first loop pattern 28 is formed on the first main surface 22a of the substrate 22. A protective layer 40 such as a resin layer protecting the second loop pattern 28 is formed on the second main surface 22b of the substrate 22.

As shown in FIGS. 1 and 2, the antenna base material 50 mounted with the RFIC module 20 comprises, in the case of the first embodiment, a base material sheet 52 made from a resin material having a flexibility, and an antenna conductor 54 that is a conductor pattern formed on a surface 52a on one hand of the base material sheet 52.

According to the first exemplary embodiment, the RFIC module 20 is disposed on the surface 52a of the base material sheet 52 of the antenna base material 50, similar to the antenna conductor 54. Specifically, the RFIC module 20 is attached, on its outer surface 20a toward the first main surface 22a (toward the protective layer 38) of the substrate 22 or on its outer surface 20b toward the second main surface 22b (toward the protective layer 40), to the surface 52a of the base material sheet 52 by an insulating adhesive such as an epoxy resin-based adhesive for example.

Since the base material sheet 52 has a flexibility as described above, the RFIC module 20 is hard to separate from the base material sheet 52. For example, if the base material sheet of the antenna base material is a rigid body, when an impact acts on the RFID tag, the impact may cause the RFIC module to separate from the base material sheet. On the other hand, if the base material sheet is flexible, the impact on the RFID tag can be warded off due to the deformation of the base material sheet. As a result, coupling (mechanical coupling and electromagnetic field coupling) of the antenna base material with the RFIC module is more secured.

The antenna conductor 54 comprises a coupling portion 54a electromagnetic field coupling with the loop conductor 26 of the RFIC module 20, a first radiating portion 54b extending from the coupling portion 54a in a meandering manner toward one side in the longitudinal direction (Y-axis direction) of the base material sheet 52, and a second radiating portion 54c extending from the coupling portion 54a in a meandering manner toward the other side in the longitudinal direction.

As shown in FIGS. 1 and 2, the coupling portion 54a of the antenna conductor 54 is a loop-shaped conductor pattern, more specifically, a loop-shaped (semi-loop-shaped) conductor pattern of less than one turn. In the case of the first embodiment, the RFIC module 20 is disposed inside the semi-looped coupling portion 54a in a non-contact state. This allows the loop conductor 26 of the RFIC module 20 to lie inside the semi-looped coupling portion 54a when viewed from the direction (Z-axis direction) in which the RFIC module 20 is mounted on the antenna base material 50. The coupling portion 54a and the loop conductor 26 are thus electromagnetic field coupled together.

Specifically, when the radiating portions 54b and 54c of the antenna conductor 54 receive radio waves, a current flows through the antenna conductor 54. The current generates a magnetic field at the coupling portion 54a. The generated magnetic field allows a current to flow through the loop conductor 26, the current driving the RFIC chip 24. By such electromagnetic field coupling (mainly, magnetic field coupling), the RFID tag 10 (the RFIC chip 24) can wirelessly communicate with an external communication device (not shown) such as a reader device at a UHF-zone communication frequency in the case of the first embodiment. In an exemplary aspect, the antenna conductor 54 may be a dipole antenna having a resonant frequency corresponding to a communication frequency (e.g. a UHF-zone frequency), i.e. a dipole antenna having an electrical length corresponding to $\lambda/2$ ($\lambda$ is a communication wavelength), but it is not limited to one having such a resonant frequency or an electrical length.

In the RFIC module 20 of the first embodiment, the loop conductor 26 includes the first loop pattern 28 formed on the first main surface 22a of the substrate 22 and the second loop pattern 30 formed on the second main surface 22b. These first loop pattern 28 and second loop pattern 30 are connected in series via the interlayer connection conductor 32.

Accordingly, even though the RFIC module 20 is mounted on the antenna substrate 50 such that the first loop pattern 28 lies closer to the antenna substrate 50 than the second loop pattern 30 lies or conversely even though the RFIC module 20 is mounted such that the second loop pattern 30 is closer to the antenna substrate 50 than the first loop pattern 28 lies, the degree of coupling of the electromagnetic field coupling between the coupling portion 54a of the antenna conductor 54 and the loop conductor 26 do not substantially vary. That is, the communication characteristics such as a communicable distance of the RFID tag 10, related to the degree of coupling, do not substantially vary. Hence, the RFID tag 10 can stably obtain desired communication characteristics.

The RFIC module 20 is disposed inside the coupling portion 54a of the antenna conductor 54. In other words, the RFIC module 20 is prevented from partially overlapping with the coupling portion 54a. This suppresses the disconnection in the coupling portion 54a of the antenna conductor 54 by an edge (edge between the two surfaces) of the RFIC module 20.

For example, in the case where the RFID tag 10 is attached to a linen to be washed, the antenna base material 50 is often subjected to various deformations during washing. At this time, if the RFIC module 20 partially overlaps with the coupling portion 54a, the edge of the RFIC module 20 comes into repetitive contact with the coupling portion 54a, with the result that the contact part may possibly disconnect. Thus, in some use applications of the RFID tag, it is preferred that the RFIC module 20 be not in contact with the coupling portion 54a of the antenna conductor 54.

According to the first embodiment, the RFIC module 20 and the antenna conductor 54 can be electromagnetic field coupled suppressing the variations in the degree of coupling.

Second Embodiment

A second exemplary embodiment differs from the first embodiment described above in the mode of electromagnetic coupling between the loop conductor of the RFIC module and the coupling portion of the antenna conductor. An RFID tag of the second embodiment comprises the RFIC module of the above first embodiment. On the other hand, an antenna base material of the second embodiment has the same structure as that of the antenna base material 50 of the first embodiment, but differs in size therefrom. Accordingly, differences will mainly be described for the second embodiment.

Figure 5:
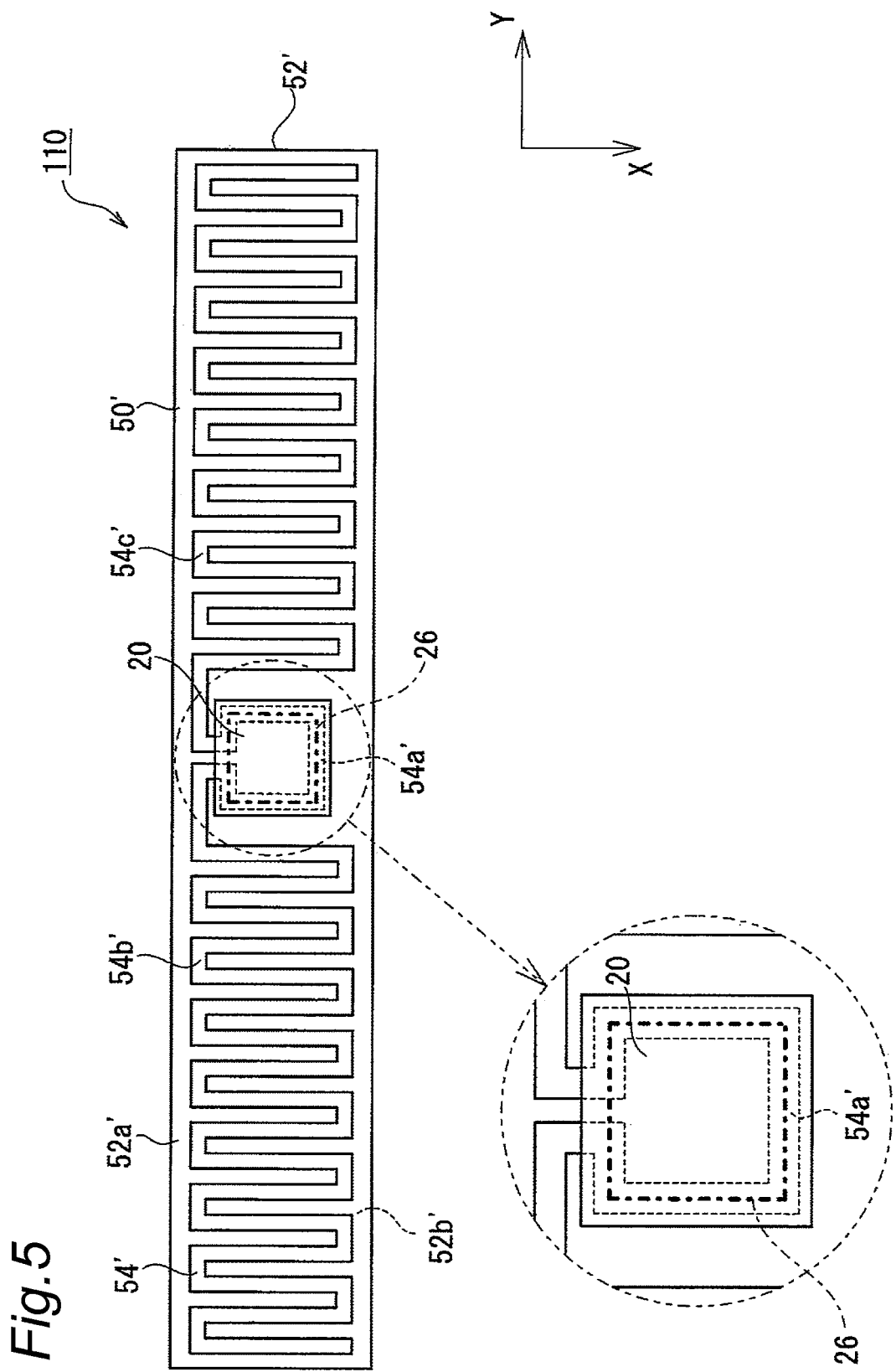
FIG. 5 is a top view of an RFID tag according to a second exemplary embodiment.

FIG. 5 is a top view of the RFID tag according to the second embodiment. In this specification, as regards reference numerals, structural elements designated by reference numerals with "'" (i.e., an apostrophe) is the same in structure as but different in size from structural elements designated by the same reference numerals without the apostrophes. For example, an antenna base material 50' shown in FIG. 5 has the same structure as but different size from the antenna base material 50 shown in FIG. 2.

As shown in FIG. 5, in the case of an RFID tag 110 of the second embodiment, a coupling portion 54a' of an antenna conductor 54' in the antenna base material 50' is of a loop shape of less than one turn (a semi-loop shape).

Different from the first embodiment described above, however, the coupling portion 54a' of the second embodiment is overlapped by the RFIC module 20 when viewed from a direction (when viewed from the Z-axis direction (when viewed from a direction normal to the drawing)) in which the RFIC module 20 is mounted on the antenna base material 50' (a base material sheet 52'). More specifically, the coupling portion 54a' is overlapped by the loop conductor 26 of the RFIC module 20.

Overlapping of the loop conductor 26 of the RFIC module 20 with the semi-looped coupling portion 54a' of the antenna conductor 54' configures the loop conductor 26 and the coupling portion 54a' to be electromagnetic field coupled at a higher degree of coupling (as compared with the case where the loop conductor is disposed inside the coupling portion as in the first embodiment described above).

In order to more enhance the degree of coupling in the electromagnetic field coupling, the first and the second loop patterns 28 and 30 in the loop conductor 26 of the RFIC module 20 and the semi-looped coupling portion 54a' of the antenna conductor 54' may confront each other having the same width.

Due to the overlapping of the loop conductor 26 with the semi-looped coupling portion 54a', the coupling portion 54a' is inevitably covered and protected substantially throughout by the RFIC module 20. Thus, the electromagnetic field coupling between the loop conductor 26 and the coupling portion 54a' is more maintained.

Similar to the first embodiment described above, according to such a second embodiment, the RFIC module 20 and the antenna conductor 54' can be electromagnetic field coupled, suppressing the variations in the degree of coupling.

Third Embodiment

A third exemplary embodiment differs from the above first embodiment in the coupling portion of the antenna conductor. An RFID tag of the third embodiment comprises the RFIC module of the above first embodiment. Accordingly, differences will mainly be described for the third embodiment.

Figure 6:
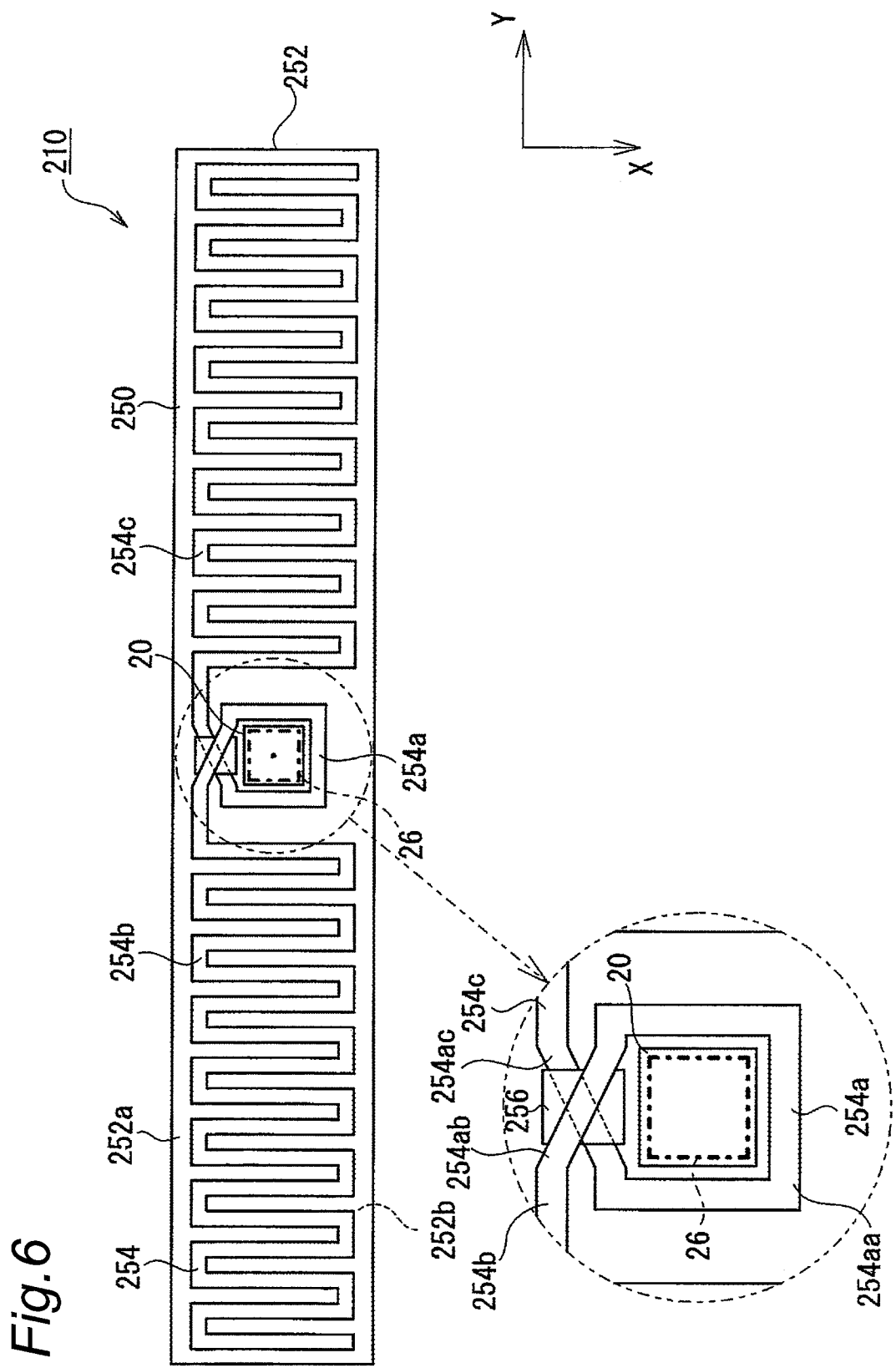
FIG. 6 is a top view of an RFID tag according to a third exemplary embodiment.

FIG. 6 is a top view of the RFID tag according to the third embodiment.

As shown in FIG. 6, in the case of an RFID tag 210 of the third embodiment, a coupling portion 254a of an antenna conductor 254 in an antenna base material 250 is in the shape of a loop. Specifically, however, it has a loop shape of more than one turn, different from the coupling portion 54a having the loop shape (semi-loop shape) of less than one turn of the antenna conductor 54 in the first embodiment.

Since the coupling portion 254a of the antenna conductor 254 is of a loop shape of more than one turn, it has a three-dimensional intersection. Specifically, one end 254ab of the coupling portion 254a connecting to one radiating portion 254b three-dimensionally intersects with the other end 254ac connecting to the other radiating portion 254c, to thereby form a three-dimensional intersection of the coupling portion 254a. A body portion 254ac between the two ends 254ab and 254ac surrounds three sides of the RFIC module 20. An insulating layer 256 is disposed between the one end 254ab and the other end 254ac that three-dimensionally intersect.

The RFIC module 20 is disposed inside such a looped coupling portion 254a of more than one turn. That is, the RFIC module 20 is surrounded over the entire circumference by the coupling portion 254a. This allows the looped coupling portion 254a of more than one turn to be electromagnetic field coupled with the looped conductor 26 of the RFIC module 20 at a higher degree of coupling, as compared with the looped coupling portion of less than one turn.

Similar to the first embodiment described above, according to such a third embodiment, the RFIC module 20 and the antenna conductor 254 can be electromagnetic field coupled, suppressing the variations in the degree of coupling.

Fourth Embodiment

A fourth exemplary embodiment differs from the third embodiment described above in the mode of electromagnetic coupling between the loop conductor of the RFIC module and the coupling portion of the antenna conductor. An RFID tag of the fourth embodiment comprises the RFIC module of the above third embodiment. On the other hand, an antenna base material of the fourth embodiment is the same in structure as but different in size from the antenna base material 250 of the third embodiment. Accordingly, differences will mainly be described for the fourth embodiment.

Figure 7:
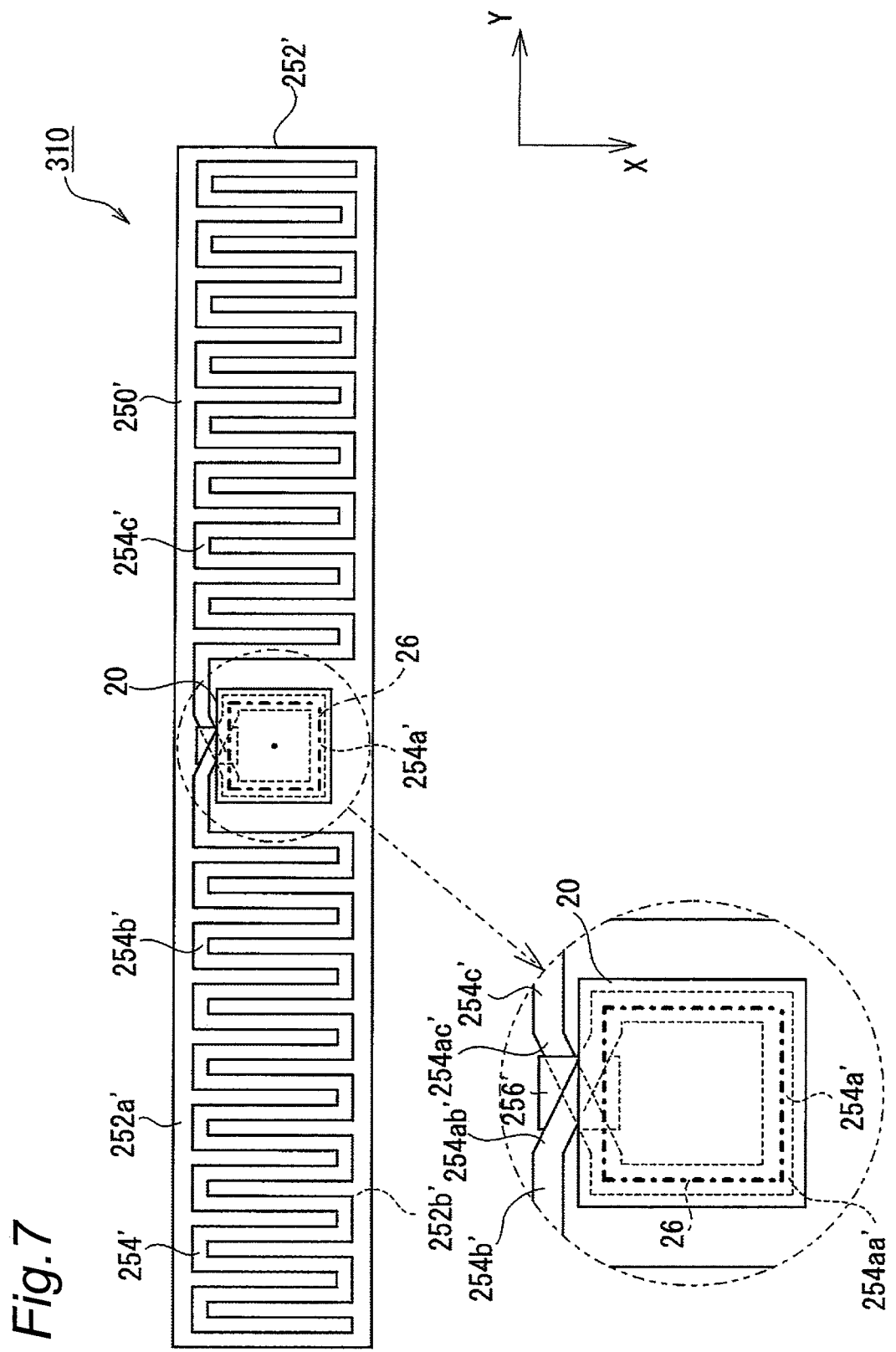
FIG. 7 is a top view of an RFID tag according to a fourth exemplary embodiment.

FIG. 7 is a top view of the RFIC tag according to the fourth embodiment.

As shown in FIG. 7, in the case of an RFID tag 310 of the fourth embodiment, a coupling portion 254' of an antenna conductor 254' in an antenna base material 250' is of a loop shape of more than one turn.

The fourth embodiment differs from the third embodiment described above in that a coupling portion 254a' of the fourth embodiment is overlapped by the RFIC module 20 when viewed from a direction (when viewed from the Z-axis direction (when viewed from a direction normal to the drawing)) in which the RFIC module 20 is mounted on the antenna base material 250' (a base material sheet 252'). More specifically, the coupling portion 254a' is overlapped by the loop conductor 26 of the RFIC module 20.

Overlapping of the loop conductor 26 of the RFIC module 20 with the semi-looped coupling portion 254a' of the antenna conductor 254' allows the loop conductor 26 and the coupling portion 254a' to be electromagnetic field coupled at a higher degree of coupling (as compared with the case where the loop conductor is disposed inside the coupling portion as in the third embodiment described above).

In order to further enhance the degree of coupling in the electromagnetic field coupling, the first and the second loop patterns 28 and 30 in the loop conductor 26 of the RFIC module 20 and the looped coupling portion 254a' of the antenna conductor 254' may confront each other having the same width.

Due to the overlapping of the loop conductor 26 with the semi-looped coupling portion 254a', the coupling portion 254a' is inevitably covered and protected substantially throughout by the RFIC module 20. In particular, a breakage (disconnection) is restrained from occurring at the three-dimensional intersection consisting of two ends 254ab' and 254ac' of the coupling portion 254a'. Thus, the electromagnetic field coupling between the loop conductor 26 and the coupling portion 254a' is more maintained.

Similar to the first embodiment described above, according to such a fourth embodiment, the RFIC module 20 and the antenna conductor 254' can be electromagnetic field coupled, suppressing the variations in the degree of coupling.

Fifth Embodiment

A fifth exemplary embodiment differs in the entire antenna conductor from the first and the third embodiment described above. An RFID tag of the fifth embodiment comprises the RFIC module of the above first embodiment. Accordingly, differences will mainly be described for the fifth embodiment.

Figure 8:
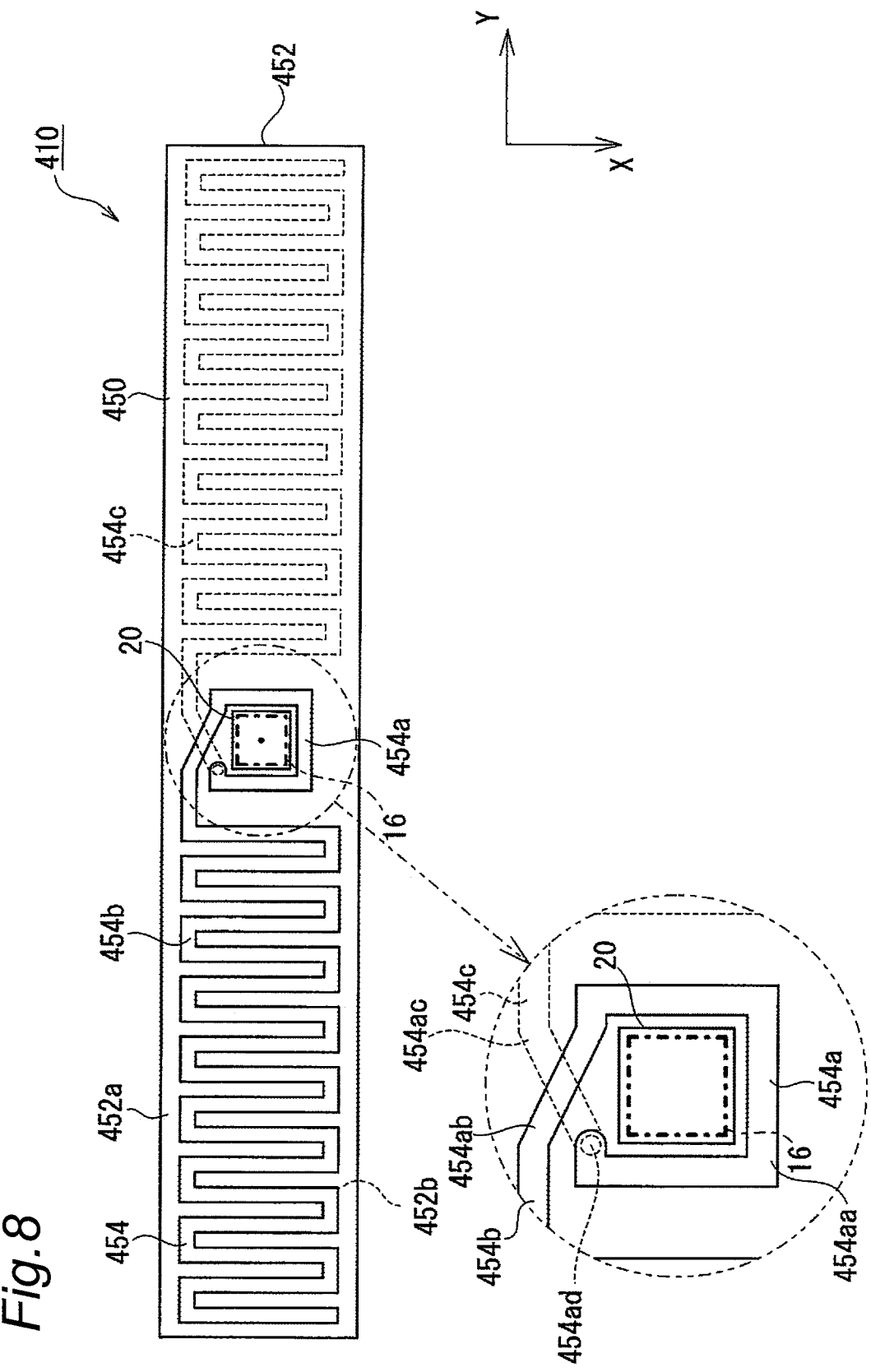
FIG. 8 is a top view of an RFID tag according to a fifth exemplary embodiment.

FIG. 8 is a top view of the RFID tag according to the fifth embodiment.

As shown in FIG. 8, in an antenna base material 450 of an RFID tag 410 of the fifth embodiment, an antenna conductor 454 comprises a looped coupling portion 454a of more than one turn. A radiating portion 454b on one hand of the antenna conductor 454 is disposed on a surface 542a on one hand of the base material sheet 452 while a radiating portion 454c on the other hand is disposed on a surface 452b on the other. For this reason, an end 454ac of the coupling portion 454a connecting to the radiating portion 454c on the other is also disposed on the surface 452b on the other of the base material sheet 452. Hence, the two ends 454ab and 454ac of the coupling portion 454a intersect three-dimensionally (form a three-dimensional intersection) with the base material sheet 452 sandwiched therebetween.

The end 454ac of the coupling portion 454a disposed on the surface 452b on the other of the base material sheet 452 is connected to a body portion 454aa of the coupling portion 454a disposed on the surface 452a on one hand to surround three sides of the RFIC module 20, via an interlayer connection conductor 454ad extending through the base material sheet 452.

The RFIC module 20 is disposed inside such a looped coupling portion 454a of more than one turn. That is, the RFIC module 20 is surrounded over the entire circumference by the coupling portion 454a. This allows the looped coupling portion 454a of more than one turn to be electromagnetic field coupled with the looped conductor 26 of the RFIC module 20 at a higher degree of coupling, as compared with the looped coupling portion of less than one turn.

Similar to the first embodiment described above, according to such a fifth embodiment, the RFIC module 20 and the antenna conductor 454' can be electromagnetic field coupled, suppressing the variations in the degree of coupling.

Sixth Embodiment

A sixth exemplary embodiment differs from the fifth embodiment described above in the mode of electromagnetic field coupling between the loop conductor of the RFIC module and a coupling portion of the antenna conductor. An RFID tag of the sixth embodiment comprises the RFIC module of the above fifth embodiment. On the other hand, an antenna base material of the sixth embodiment is the same in structure as but different in size from the antenna base material 450 of the above fifth embodiment. Accordingly, differences will mainly be described for the sixth embodiment.

Figure 9:
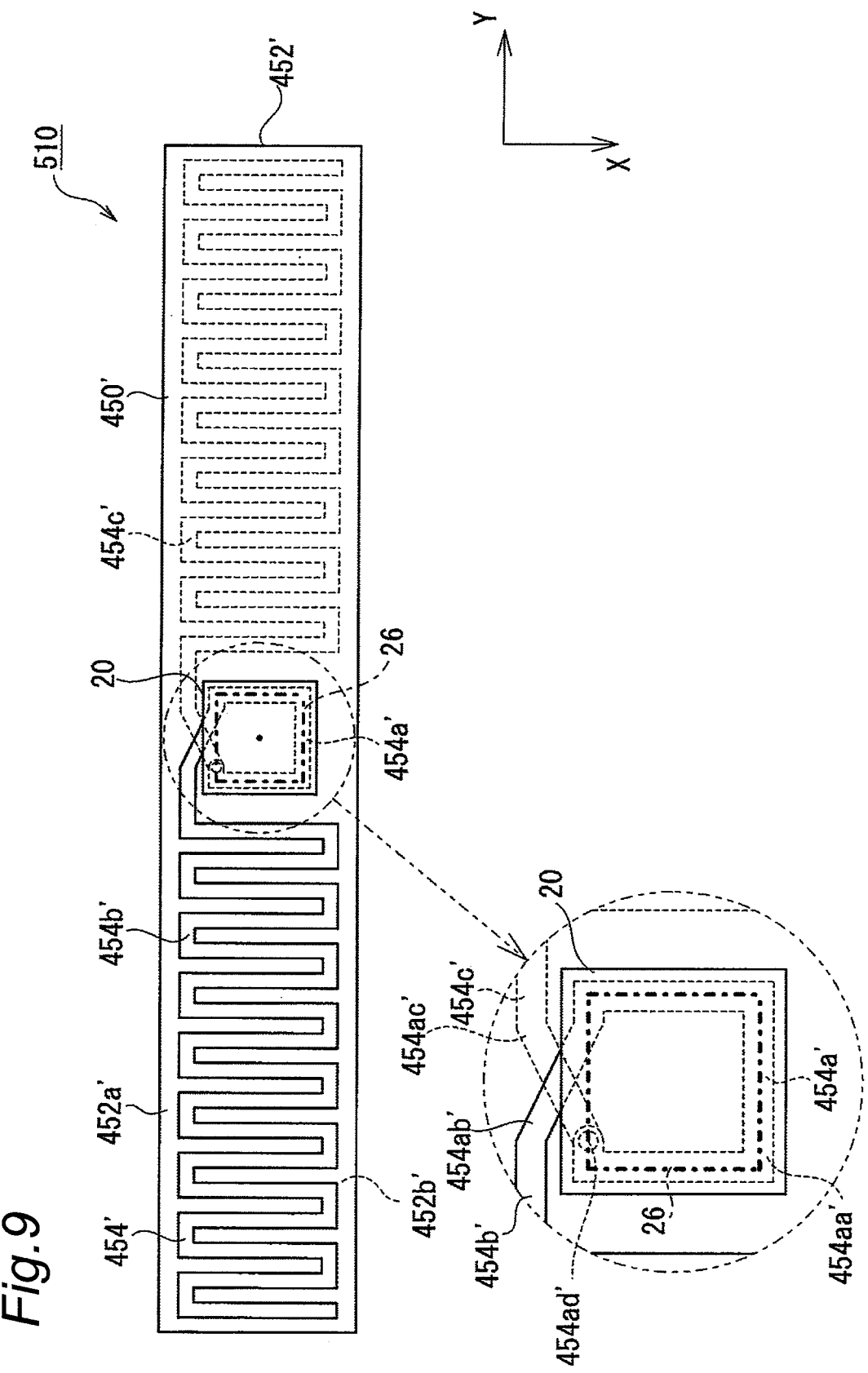
FIG. 9 is a top view of an RFID tag according to a sixth exemplary embodiment.

FIG. 9 is a top view of the RFIC tag according to the sixth embodiment.

As shown in FIG. 9, in the case of an RFID tag 510 of the sixth embodiment, a coupling portion 454a' of an antenna conductor 454' in the antenna base material 450' is of a loop shape of more than one turn.

The sixth embodiment differs from the fifth embodiment described above in that the coupling portion 454a' of the sixth embodiment is overlapped by the RFIC module 20 when viewed from a direction (when viewed from the Z-axis direction (when viewed from a direction normal to the drawing)) in which the RFIC module 20 is mounted on the antenna base material 450' (a base material sheet 452'). More specifically, the coupling portion 454a' is overlapped by the loop conductor 26 of the RFIC module 20.

Overlapping of the loop conductor 26 of the RFIC module 20 with the looped coupling portion 454a' of the antenna conductor 454' allows the loop conductor 26 and the coupling portion 454a' to be electromagnetic field coupled at a higher degree of coupling (as compared with the case where the loop conductor is disposed inside the coupling portion as in the fifth embodiment described above).

In order to further enhance the degree of coupling in the electromagnetic field coupling, the first and the second loop patterns 28 and 30 in the loop conductor 26 of the RFIC module 20 and the looped coupling portion 454a' of the antenna conductor 454' may confront each other having the same width.

Due to the overlapping of the loop conductor 26 with the semi-looped coupling portion 454a', the coupling portion 454a' is inevitably covered and protected substantially throughout by the RFIC module 20. In particular, the interlayer connection conductor 454ad' implementing the three-dimensional intersection consisting of the two ends 454ab' and 454ac' of the coupling portion 454a' is protected whereby a breakage (disconnection) is restrained from occurring at a connecting portion between the interlayer connection conductor 454ad' and the body portion 454aa' and at a connecting portion between the interlayer connection conductor 454ad' and the end 454ac'. Thus, the electromagnetic field coupling between the loop conductor 26 and the coupling portion 254a' is more maintained.

Similar to the first embodiment described above, according to such a sixth embodiment, the RFIC module 20 and the antenna conductor 454' can be electromagnetic field coupled, suppressing the variations in the degree of coupling.

Seventh Embodiment

A seventh exemplary embodiment differs from the first embodiment described above in the coupling portion of the antenna conductor. An RFID tag of the seventh embodiment comprises the RFIC module of the above first embodiment. Accordingly, differences will mainly be described for the seventh embodiment.

Figure 10:
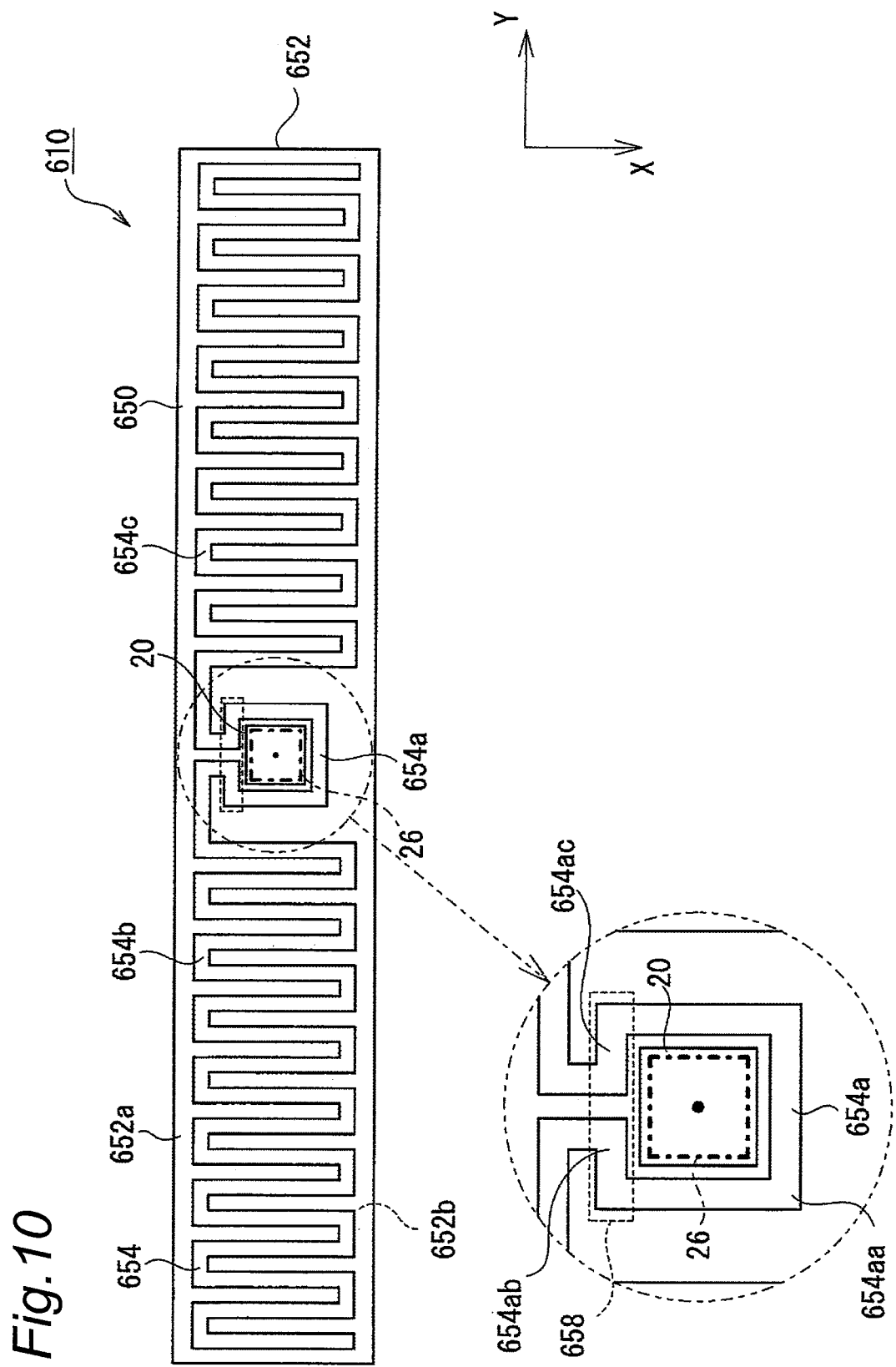
FIG. 10 is a top view of an RFID tag according to a seventh exemplary embodiment.

FIG. 10 is a top view of the RFIC tag according to the seventh embodiment.

As shown in FIG. 10, a coupling portion 654a in an antenna conductor 654 of an RFID tag 610 of the seventh embodiment is in the shape of a one-turn loop. Specifically, the one-turn loop is configured by a less-than-one-turn looped (semi-looped) body portion 654aa disposed on a surface 652a on one hand of the base material sheet 652 and a belt-shaped capacitance-forming conductor 658 disposed on a surface 652b on the other.

As shown in FIG. 10, the belt-shaped capacitance-forming conductor 658 comprises an end on one hand capacitively coupling with an end 654ab on one hand of the semi-looped body portion 654aa and an end on the other capacitively coupling with an end 654ac on the other of the body portion 654aa. Such a body portion 654aa and capacitance-forming conductor 658 make up the looped coupling portion 654a.

Such a discontinuous looped coupling portion 654a can also electromagnetic field couple with the loop conductor 26 of the RFIC module 20.

The looped coupling portion 654a is formed without three-dimensional intersection of the antenna conductor as shown in FIG. 6 and without use of the interlayer connection conductor as shown in FIG. 8. In consequence, the coupling portion 654a of the antenna conductor 654 according to the seventh embodiment is hard to disconnect due to the structure not having the three-dimensional intersection nor the interlayer connection conductor, even though the base material sheet 652 is subjected to repetitive deformations.

Furthermore, in the case of the RFID tag 610 shown in FIG. 10, the arrangement of the RFIC module 20 inside the looped coupling portion 654a more suppresses a disconnection of the coupling portion 654a of the antenna conductor 654. As a result, the RFID tag 610 can keep and continue its communication characteristics even though the antenna base material 650 repetitively deforms to a great extent and over a prolonged period of time.

By properly setting the length of the capacitance-forming conductor 658 and the area thereof confronting the coupling portion 654a, the antenna conductor 654 can be configured to have a resonant frequency substantially equal to the resonant frequency of the RFIC module 20. This enables the coupling portion 654a of the antenna conductor 654 and the loop conductor 26 of the RFIC module 20 to be electromagnetic field coupled with a higher degree of coupling, due to having substantially equal resonant frequency.

Similar to the first embodiment described above, according to such a seventh embodiment, the RFIC module 20 and the antenna conductor 654 can be electromagnetic field coupled, suppressing the variations in the degree of coupling.

Eighth Embodiment

In the case of the first to the seventh embodiments described above, the antenna conductor is a conductor pattern disposed on the base material sheet made of a resin material. However, exemplary embodiments described above are not limited thereto.

Figure 11:
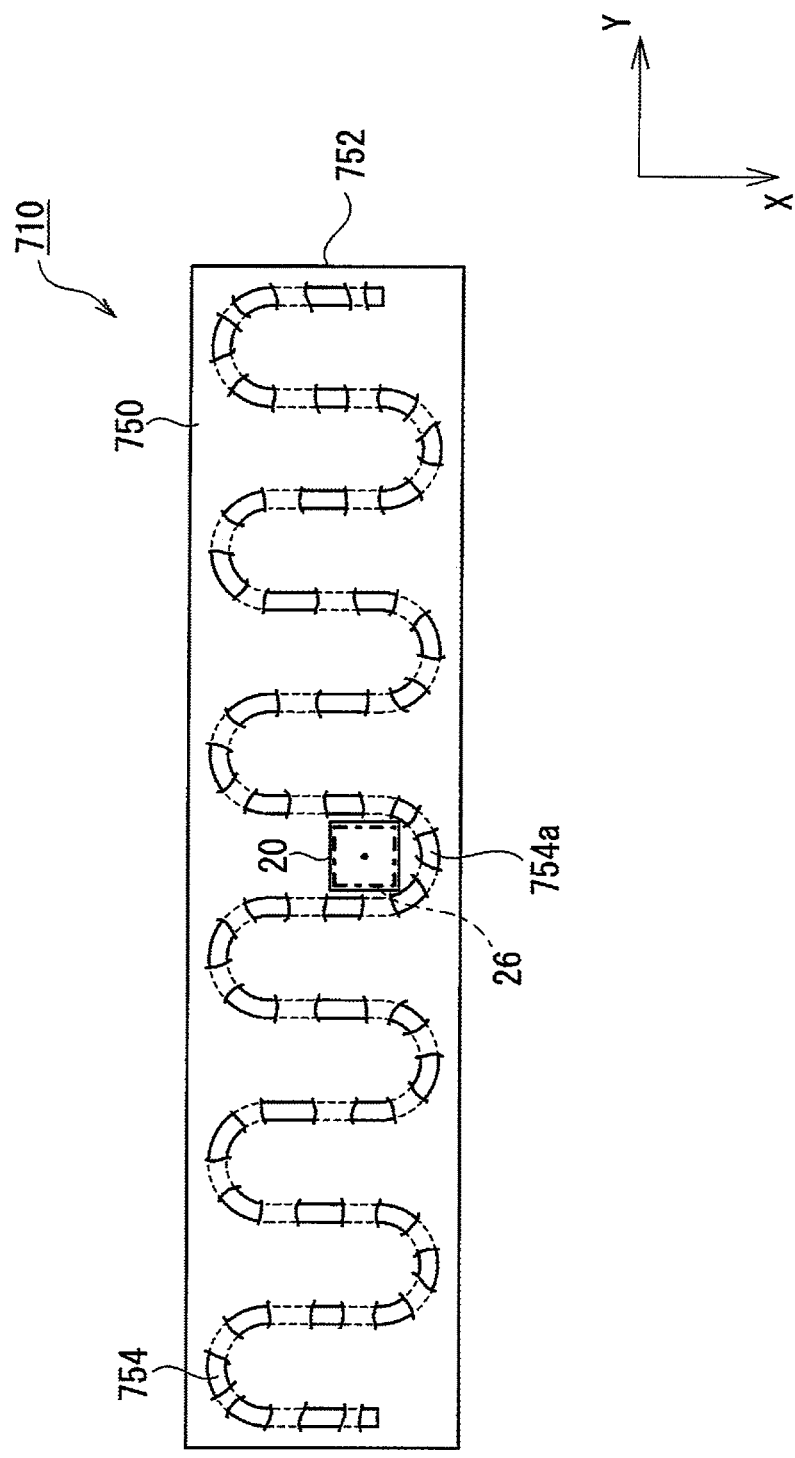
FIG. 11 is a top view of an example of a RFID tag according to an eighth exemplary embodiment.
Figure 12:
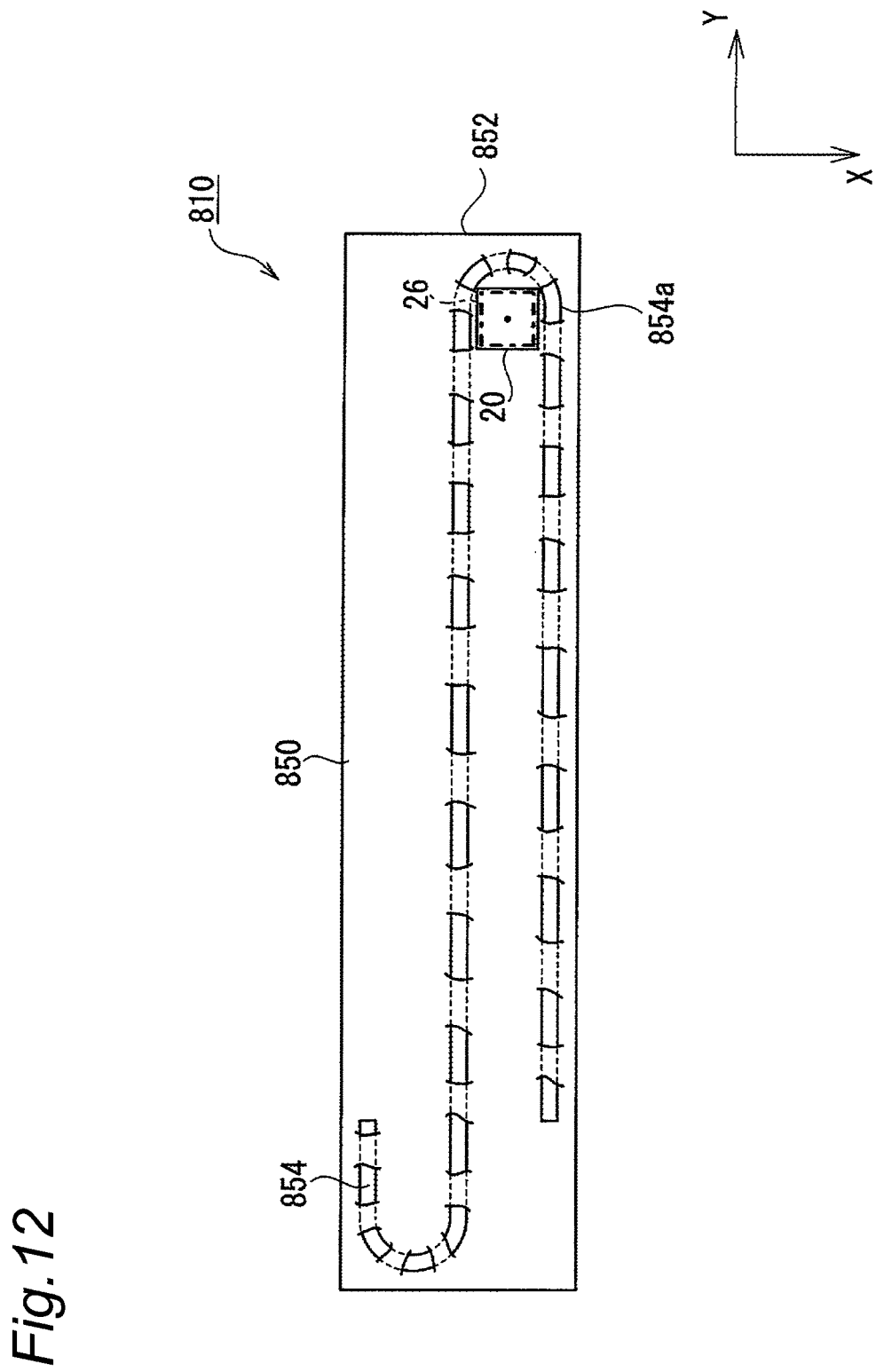
FIG. 12 is a top view of another example of the RFID tag according to the eighth exemplary embodiment.
Figure 13:
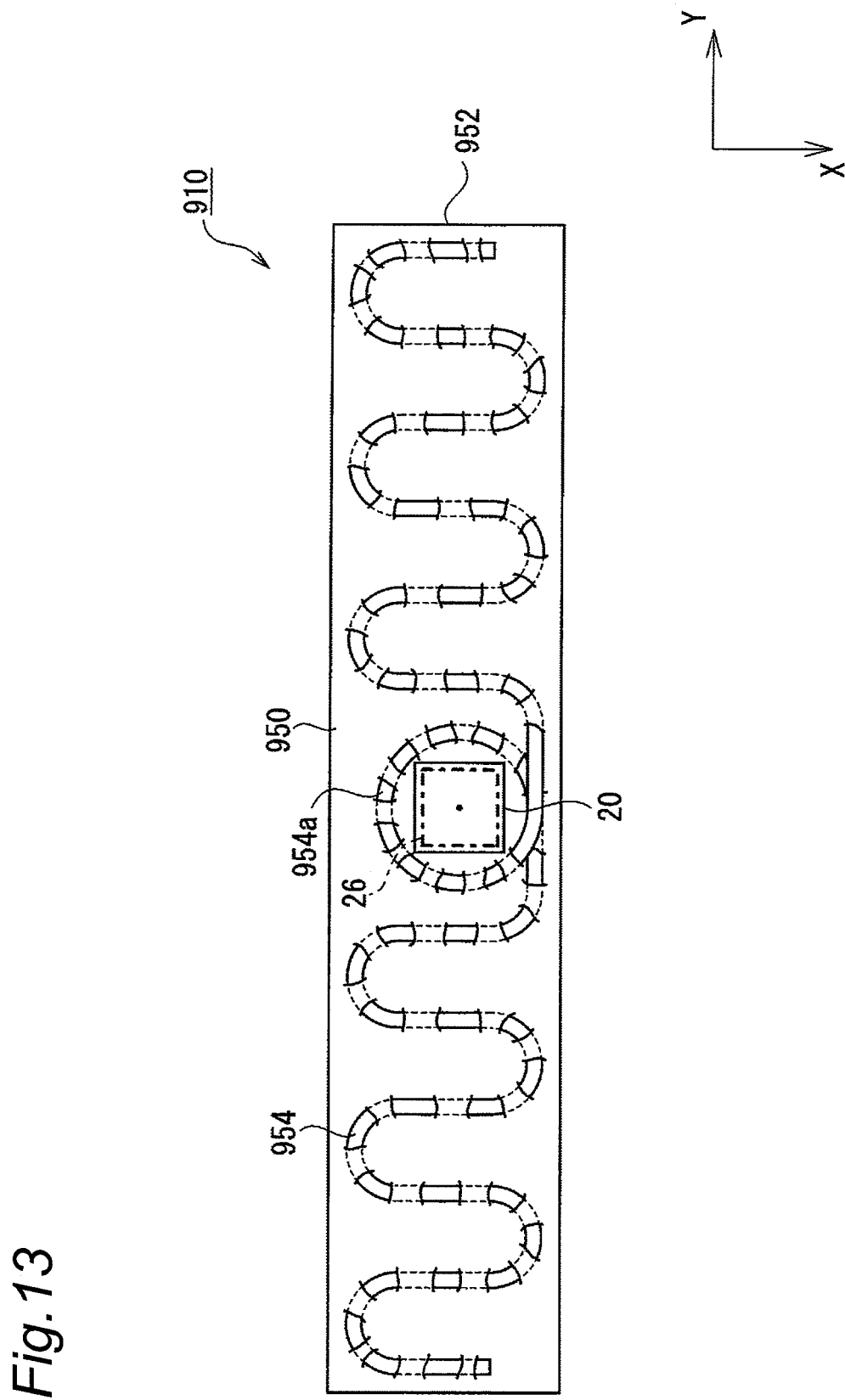
FIG. 13 is a top view of yet another example of the RFID tag according to the eighth exemplary embodiment.

FIGS. 11 to 13 are top views of an RFID tag of different examples according to an eighth embodiment.

In the case of an RFID tag 710 of an example shown in FIG. 11, a base material sheet 752 of an antenna base material 750 is a fabric member, with an antenna conductor 754 being a conducting wire such as metal wire for example stitched on the base material sheet 752. In the RFID tag 710 shown in FIG. 11, the antenna conductor 754 is stitched in a meandering manner on the base material sheet 752. A Turning portion 754a of the antenna conductor 754 functions as a coupling portion that electromagnetic field couples with the loop conductor 26 of the RFIC module 20. The RFIC module 20 is attached to the base material sheet 752 via an insulating adhesive for example.

In the case of an RFID tag 810 of another example shown in FIG. 12, an antenna conductor 854 is stitched on a base material sheet 852 in an S-shaped manner. A turning portion 854a of the antenna conductor 854 functions as a coupling portion that electromagnetic field couples with the loop conductor 26 of the RFIC module 20.

In the case of 910 of yet another example shown in FIG. 13, an antenna conductor 954 is stitched in a meandering manner on a base material sheet 952 so as to form a loop portion 954a. This loop portion 954a functions as a coupling portion that electromagnetic-field couples with the loop conductor 26 of the RFIC module 20.

In this manner, by forming the base material sheet of the antenna base material from a fabric member and by stitching a conducting wire as an antenna conductor onto the base material sheet, a freely deformable RFID tag can be configured. That is, an RFID tag hard to disconnect irrespective of deformation can be implemented.

According to such an eighth embodiment, similar to the first embodiment described above, the RFIC module 20 and the antenna conductor 754, 854, 954 can be electromagnetic field coupled, suppressing the variations in the degree of coupling.

Although the present invention has been described using the plurality of first to eighth embodiments, it should be appreciated that the exemplary embodiments of the present invention are not limited thereto.

For example, in the case of the second, the fourth, and the sixth embodiments described above, the RFIC module 20 is overlapped on the looped coupling portions 54a', 254a', and 454a' of the antenna conductors 54', 254', and 454' and further the loop conductor 26 of the RFIC module 20 is also overlapped thereon. However, exemplary embodiments of the present invention are not limited to those. For example, the loop conductor may lie inside the looped coupling portion of the antenna conductor, with the RFIC module 20 being overlapped on the looped coupling portion. Otherwise, the loop conductor may lie so as to encompass the looped coupling portion. In these cases as well, the coupling portion of the antenna conductor and the loop conductor of the RFIC module can be electromagnetic field coupled.

It will be apparent to those skilled in the art that a further embodiment according to the present invention can be obtained by combining an embodiment with the entirety or part of at least another embodiment.

Thus, the RFID tag of the exemplary embodiments according to the present disclosure generally comprises an RFIC module including a substrate, an RFIC chip disposed on the substrate, and a loop conductor disposed on the substrate and connected to the RFIC chip; and an antenna base material mounted with the RFIC module and comprising an antenna conductor including a radiating portion radiating radio waves and a coupling portion connected to the radiating portion, for electromagnetic field coupling with the loop conductor. Moreover, the loop conductor includes a first loop pattern formed on a first main surface of the substrate, a second loop pattern formed on a second main surface confronting the first main surface, and an interlayer connection conductor extending through the substrate for connecting the first and the second loop patterns in series.

The exemplary embodiments of the present disclosure are applicable to an RFID tag in which an RFIC module and an antenna are electromagnetic field coupled.

EXPLANATIONS OF LETTERS OR NUMERALS

10 RFID tag
20 RFIC module
22 substrate
24 RFIC chip
26 loop conductor
28 first loop pattern
30 second loop pattern
32 interlayer connection conductor
50 antenna base material
54 antenna conductor
54a coupling portion
54b radiating portion
54c radiating portion

The invention claimed is:
1. An RFID tag comprising:
an RFIC module including a substrate, an RFIC chip disposed on the substrate, and a loop conductor disposed on the substrate and connected to the RFIC chip; and
an antenna base mounted with the RFIC module and comprising an antenna conductor that includes a radiating portion configured to radiate radio waves and a coupling portion connected to the radiating portion and configured to electromagnetic field couple with the loop conductor that is structurally separate from the coupling portion of the antenna base,
wherein the loop conductor includes a first loop pattern disposed on a first main surface of the substrate, a second loop pattern disposed on a second main surface of the substrate that opposes the first main surface, and an interlayer connection conductor that extends through the substrate and serially connects the first loop pattern to the second loop pattern.

2. The RFID tag according to claim 1, wherein the coupling portion of the antenna conductor is a loop-shaped coupling portion.

3. The RFID tag according to claim 2, wherein the RFIC module is disposed inside the loop-shaped coupling portion in a plan view in which the RFIC module is mounted on the antenna base.

4. The RFID tag according to claim 3, wherein the loop-shaped coupling portion overlaps the loop conductor of the RFIC module.

5. The RFID tag according to claim 2, wherein the RFIC module is mounted on the antenna base and overlaps the loop-shaped coupling portion in a plan view in which the RFIC module is mounted on the antenna base.

6. The RFID tag according to claim 1, wherein the coupling portion of the antenna conductor comprises a looped conductor with less than one turn disposed on a surface on one portion of the antenna base, and a capacitance-forming conductor disposed on the surface on another portion of the antenna base, for capacitively coupling with a first end and a second end of the looped conductor of less than one turn.

7. The RFID tag according to claim 1, wherein the antenna base comprises a flexible base material.

8. An RFID tag comprising:
an RFIC module including a substrate, an RFIC chip disposed on the substrate, and a loop conductor disposed on the substrate and connected to the RFIC chip; and
an antenna base mounted with the RFIC module and comprising an antenna conductor that includes a radiating portion configured to radiate radio waves and a coupling portion connected to the radiating portion and configured to electromagnetic field couple with the loop conductor,
wherein the loop conductor includes a first loop pattern disposed on a first main surface of the substrate, a second loop pattern disposed on a second main surface of the substrate that opposes the first main surface, and an interlayer connection conductor that extends through the substrate and serially connects the first loop pattern to the second loop pattern,
wherein the coupling portion of the antenna conductor is a loop-shaped coupling portion,
wherein the RFIC module is mounted on the antenna base and overlaps the loop-shaped coupling portion in a plan view in which the RFIC module is mounted on the antenna base, and
wherein the loop-shaped coupling portion comprises one or more turns including a three-dimensional intersection.

9. The RFID tag according to claim 8, wherein the RFIC module is mounted on the antenna base and at least partially overlaps with the three-dimensional intersection of the loop-shaped coupling portion.

10. The RFID tag according to claim 9, wherein the loop-shaped coupling portion overlaps the loop conductor of the RFIC module.

11. An RFID tag comprising:
an antenna base including an antenna conductor with a radiating portion configured to radiate radio waves;
an RFIC module disposed on the antenna base and including a substrate and a loop conductor having a first loop pattern disposed on a first main surface of the substrate, a second loop pattern disposed on a second main surface of the substrate that opposes the first main surface, and at least one interlayer connection conductor that extends through the substrate and serially connects the first loop pattern to the second loop pattern;
an RFIC chip disposed on the substrate that is electrically connected to the loop pattern; and
a coupling portion connected to the radiating portion of the antenna base and configured to electromagnetically field couple with the loop conductor of the RFIC module that is structurally separate from the coupling portion.

12. The RFID tag according to claim 11, wherein the RFIC chip comprises a first input/output terminal directly coupled to one end of the first loop pattern and a second input/output terminal directly coupled to the at least one interlayer connection conductor.

13. The RFID tag according to claim 12, wherein the at least one interlayer connection conductor extends through the substrate and is directly connected to one end of the second loop pattern.

14. The RFID tag according to claim 11, wherein the coupling portion of the antenna conductor is a loop-shaped coupling portion.

15. The RFID tag according to claim 14, wherein the RFIC module is disposed inside the loop-shaped coupling portion in a plan view in which the RFIC module is mounted on the antenna base.

16. The RFID tag according to claim 14, wherein the RFIC module is mounted on the antenna base and overlaps the loop-shaped coupling portion in a plan view in which the RFIC module is mounted on the antenna base.

17. The RFID tag according to claim 16, wherein the loop-shaped coupling portion comprises one or more turns including a three-dimensional intersection.

18. The RFID tag according to claim 17, wherein the RFIC module is mounted on the antenna base and at least partially overlaps with the three-dimensional intersection of the loop-shaped coupling portion.

19. The RFID tag according to claim 18, wherein the loop-shaped coupling portion overlaps the loop conductor of the RFIC module.

20. The RFID tag according to claim 11, wherein the coupling portion of the antenna conductor comprises a looped conductor with less than one turn disposed on a surface on one portion of the antenna base, and a capacitance-forming conductor disposed on the surface on another portion of the antenna base, for capacitively coupling with a first end and a second end of the looped conductor of less than one turn.

* * * * *